(12) United States Patent
Imielinski

(10) Patent No.: US 12,518,878 B1
(45) Date of Patent: Jan. 6, 2026

(54) AMPLICON PASSENGERS AS IMMUNE-ONCOLOGY TARGETS

(71) Applicant: Cornell University, Ithaca, NY (US)

(72) Inventor: Marcin Imielinski, New York, NY (US)

(73) Assignee: Cornell University, Ithaca, NY (US)

( * ) Notice: Subject to any disclaimer, the term of this patent is extended or adjusted under 35 U.S.C. 154(b) by 95 days.

(21) Appl. No.: 18/123,025

(22) Filed: Mar. 17, 2023

Related U.S. Application Data

(60) Provisional application No. 63/321,429, filed on Mar. 18, 2022.

(51) Int. Cl.
*G16H 50/20* (2018.01)
*G16B 30/00* (2019.01)
*G16B 40/20* (2019.01)
*G16B 45/00* (2019.01)

(52) U.S. Cl.
CPC .......... *G16H 50/20* (2018.01); *G16B 30/00* (2019.02); *G16B 40/20* (2019.02); *G16B 45/00* (2019.02)

(58) Field of Classification Search
None
See application file for complete search history.

(56) References Cited

U.S. PATENT DOCUMENTS

| | | | |
|---|---|---|---|
| 8,628,927 B2 | 1/2014 | Faham et al. | |
| 10,900,088 B2 | 1/2021 | Volgelstein et al. | |
| 10,961,586 B2 | 3/2021 | Sanborn et al. | |
| 2006/0240554 A1 * | 10/2006 | Chen | A61P 7/06 |
| | | | 435/375 |
| 2020/0232040 A1 | 7/2020 | Luksza et al. | |
| 2021/0047693 A1 | 2/2021 | Mischel et al. | |

FOREIGN PATENT DOCUMENTS

| | | | | |
|---|---|---|---|---|
| EP | 3561075 A1 | 10/2019 | | |
| WO | WO-0110884 A1 * | 2/2001 | ....... | C07K 14/70571 |
| WO | WO-2021/172990 A1 | 9/2021 | | |

OTHER PUBLICATIONS

Carrot-Zhang et al., "Whole-genome characterization of lung adenocarcinomas lacking alterations in the RTK/RAS/RAF pathway." Cell reports 34.5 (2021).

Deshpande et al., "Exploring the landscape of focal amplifications in cancer using AmpliconArchitect." Nature communications 10.1 (2019): 392.

Dewhurst et al. "Structural variant evolution after telomere crisis." Nature communications 12.1 (2021): 2093.

Gisselsson et al., "Chromosomal breakage-fusion-bridge events cause genetic intratumor heterogeneity." Proceedings of the National Academy of Sciences 97.10 (2000): 5357-5362.

Hadi et al., "Distinct classes of complex structural variation uncovered across thousands of cancer genome graphs." Cell 183.1 (2020): 197-210.

(Continued)

*Primary Examiner* — John A Pauls
(74) *Attorney, Agent, or Firm* — Foley Hoag LLP; Erik A. Huestis

(57) ABSTRACT

Methods for identifying oncogene amplicon-encoded cell surface proteins in a subject and preparing adoptive immunotherapies directed to cell surface proteins.

25 Claims, 8 Drawing Sheets

(56) References Cited

OTHER PUBLICATIONS

Hadi et al., "Novel patterns of complex structural variation revealed across thousands of cancer genome graphs." BioRxiv (2019): 836296.
Han et al., "Progress in neoantigen targeted cancer immunotherapies." Frontiers in Cell and Developmental Biology 8 (2020): 728.
Laks et al., "Clonal decomposition and DNA replication states defined by scaled single-cell genome sequencing." Cell 179.5 (2019): 1207-1221.
Richters et al., "Best practices for bioinformatic characterization of neoantigens for clinical utility." Genome medicine 11 (2019): 1-21.
Sedlazeck et al., "Piercing the dark matter: bioinformatics of long-range sequencing and mapping." Nature Reviews Genetics 19.6 (2018): 329-346.
Ulahannan et al., "Nanopore sequencing of DNA concatemers reveals higher-order features of chromatin structure." BioRxiv (2019): 833590.
Van Berkum, Nynke L., et al. "Hi-C: a method to study the three-dimensional architecture of genomes." JoVE (Journal of Visualized Experiments) 39 (2010): e1869.
Verhaak et al., "Extrachromosomal oncogene amplification in tumour pathogenesis and evolution." Nature Reviews Cancer 19.5 (2019): 283-288.
Wang et al., "A graph-based algorithm for estimating clonal haplotypes of tumor sample from sequencing data." BMC Medical Genomics 12 (2019): 107-118.

\* cited by examiner

AMPLICON PASSENGERS AS IMMUNE-ONCOLOGY TARGETS

RELATED APPLICATIONS

This application claims the benefit of priority to U.S. Provisional Patent Application Ser. No. 63/321,429 filed Mar. 18, 2022, which is incorporated by reference in its entirety.

Immune-oncology (IO) therapies, including chimeric antigen receptor-expressing T cells[1] (CAR-T cells), bi-specific T-cell engagers (BITEs)[2], and antibody-drug conjugates[3] (ADCs) can eradicate tumor cells that express a cell surface protein target. A key obstacle to the use of these therapies in solid tumors is the lack of cell surface proteins that are specifically, stably, and highly expressed in malignant cells but not expressed or expressed at lower levels in normal cells[4]. While these cell therapies have provided promising avenues to curative therapy in blood cancers, there is an unmet need to identify clonally and highly expressed tumor-specific CAR-T targets and achieve complete responses in advanced solid cancers. Given the state of the art in precision oncology testing (targeted panels), there is a second unmet need for scalable clinical diagnostic approaches that capture long-range and complex features of genome structure, which may be crucial for identifying personalized CAR-T targets in patients. Accordingly, there is an unmet need new IO strategies and companion diagnostics to identify neoantigens in cancer cells.

SUMMARY OF THE INVENTION

Disclosed herein are methods for detecting surface antigens that are over-expressed and clonally co-amplified with essential oncogenes in a subject's cancer genome. These methods may be applied on short read whole genome sequencing (WGS) and RNA-Seq alone or together with additional genome profiling technologies (long read WGS, optical mapping, chromatin conformation capture, single cell WGS) as biomarkers to nominate subjects and cell-surface antigens for treatment with a new class of precision immunotherapies, including CAR-T cells, bispecific antibodies, and antibody-drug conjugates.

Aspects of the invention disclosed herein include methods for identifying a cell surface antigen associated with amplification of an oncogene, comprising the steps of: receiving genomic data of a subject, the genomic data comprising whole genome sequencing (WGS) to identify read depth, heterozygous SNPs, and somatic rearrangement junctions; generating a junction-balanced haplotype graph from the genomic data, the graph having vertices and edges, the vertices corresponding to non-overlapping single-stranded reference genomic intervals and the edges corresponding to variant adjacencies; identifying at least one oncogene amplicon-encoded cell surface protein from the junction-balanced haplotype graph.

In some aspects, provided herein are methods of preparing an adoptive immunotherapy comprising cytotoxic T-cells (CTLs), the method comprising obtaining a sample comprising CTLs and bringing the CTLs into contact with an oncogene amplicon-encoded cell surface protein identified by the methods disclosed herein or fragment thereof, thereby allowing proliferation of activated amplicon-encoded cell surface protein-specific CTLs.

Also provided herein are computer program products for identifying a cell surface antigen associated with amplification of an oncogene, the computer program product comprising a computer readable storage medium having program instructions embodied therewith, the program instructions executable by a processor to cause the processor to perform the methods disclosed herein.

DETAILED DESCRIPTION OF THE INVENTION

To address the paucity of amenable tumor surface targets, disclosed herein are immune-oncology strategies and diagnostics that are based on the genomics of DNA amplicons in cancer cells.

Despite advances in immune-oncology and targeted therapeutics, a substantial fraction of advanced solid cancers develop aggressive, drug resistant, and deadly metastases[6]. CAR-T cell therapy has recently transformed the treatment of hematologic malignancies, leading to complete and even curative responses in relapsed and refractory cancers[1]. In contrast, the success of CAR-T therapies in solid cancers have been limited[4]. CAR-T cells and related immune-oncology therapies (BITEs[2], ADCs[3]) work by eradicating cells that express a given cell surface antigen. The efficacy of these immune-oncology therapies depends on how stably and highly the antigen is expressed on cancer cells relative to normal cells, and how well the body can tolerate the elimination of antigen-positive normal cells[4]. While the cell surface protein CD19 has provided a safe and effective CAR-T cell target in B-cell lymphomas, no similar targets have been uncovered for solid cancers. Solid cancers also exhibit a high degree of intra-tumoral heterogeneity and genomic plasticity, which is particularly relevant for late stage and metastatic tumors that are chromosomally unstable[7-9], potentially leading to antigen loss and tumor escape[4]. Notwithstanding orthogonal challenges (e.g., T-cell dysfunction, immunosuppressive tumor microenvironment)[10], the lack of stably and highly expressed, clonal, and tumor-specific cell surface antigens remains a primary challenge to applying CAR-T cell therapy and related immune-oncology approaches to solid cancers.

Figure 1:
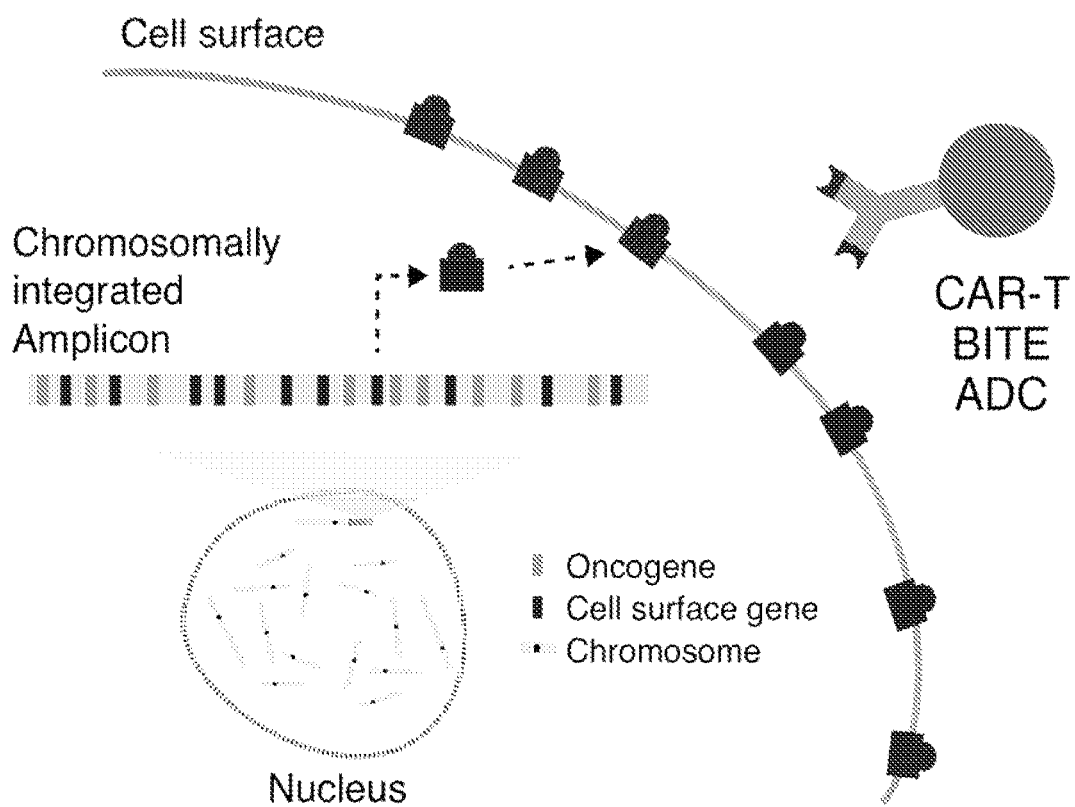
FIG. 1 depicts a schematic of an exemplary therapeutic concept. Chromosomally integrated amplicons that intersperse oncogenes and cell surface genes on a single chromosome will generate stably over-expressed and difficult to immunoedit cell surface antigens. These will provide natural targets for various IO modalities (e.g., CAR-T, BITE, ADC, and the like). The efficacy of these therapies in a given patient will depend on the details of amplicon structure, which can be inferred from patient-specific genome profiles using the methods provided herein. This therapeutic strategy and associate companion genomic diagnostic are key components of the disclosed invention.

Cancer genomes often harbor oncogene amplifications, many which occur early in tumor evolution. Integrated genomic amplicons may provide a clonal and stably expressed source of neoantigens that is difficult to immune-edit and provides a natural cell therapy target (FIG. 1). While essential oncogenes are recurrently amplified in many aggressive tumor types (e.g., MYC, CCND1, CDK4, MDM2), most are not expressed at the cell surface and thus make poor immune-oncology targets. However, the loci in which these amplified oncogenes reside often contain many copies of genes encoding cell surface proteins. In addition, these amplicons are usually clonal, ancestral, and chromosomally integrated, with the surface genes often physically interspersed with oncogenes on a linear haplotype. Patients with tumors that harbor such amplicons and clonally over-expressed proteins on their surface may be ideal antigens for immunotherapies (e.g., CAR-T therapies) that efficiently eliminate all cells expressing a given antigen. In particular, it may be very difficult for a tumor to eliminate or silence these surface genes without also eliminating the essential oncogene, placing the cancers in an evolutionary dilemma that an immunotherapy could effectively exploit. To target these oncogene-amplified tumors, recent algorithmic innovations were applied to analyze the long-range cancer genome by structure[5].

In particular, tyfonas were identified, a class of rearrangements that recurrently amplifies cell surface-associated passenger genes on chromosomes across which tens or sometimes hundreds of passenger gene and essential oncogene copies are interspersed. These and other "origami-like" amplicon structures (FIG. 1) create the aforementioned targetable evolutionary vulnerability. For example, and without being bound by any particular theory, given their physical linkage to drivers, amplicon passengers should be difficult for tumors to delete or silence without compromising fitness. As a result, it is predicted that such tumors will show complete responses to immune-oncology therapies that target amplicon-encoded cell surface proteins, whose high expression may also enable lower dosing and toxicity than standard immune-oncology targets (FIG. 1). Methods for predicting the structure and dosage of surface antigens of these amplicons from short read, chromosome conformation capture techniques including Hi-C, and long molecule (optical mapping, long read data) form the basis of a companion diagnostic that will determine which patients respond to which immune-oncology agents (e.g., CAR-T cells targeted against a given surface antigen). This strategy has the potential to yield a wide range of potent and novel anti-cancer therapies, enabling complete and curative responses in a significant subset (10%) of patients across a wide range of advanced, deadly, and therapy refractory cancers. This approach and the associated whole genome sequencing-based clinical biomarker platform significantly advances the state of the art in cancer therapy and diagnosis.

Accordingly, disclosed herein are methods to predict personalized surface antigens in a given subject's tumor and matched normal samples. Such methods include RNA-seq of a tumor and one or more genome-wide profiles of DNA from a tumor and matched normal (e.g., blood or saliva) sample. Distinct and novel methods are disclosed herein, each beginning with a different combination of DNA profiling technologies. For example, and without limitation, such methods may comprise:

1) (short) read whole genome sequencing (WGS);
2) WGS and long reads or optical mapping;[27]
3) short read WGS and chromatin conformation capture;[24,28] and
4) single cell WGS[26], optical mapping, and chromatin conformation capture.

Such methods, as are contemplated herein, all share the goal of identifying one or more surface antigen genes that
 a) are over-expressed;
 b) reside on a chromosomally integrated amplicon;
 c) are clonal;
 d) co-amplified; and
 e) linearly interspersed with one or more essential oncogenes.

In some aspects of the invention, provided herein are methods for identifying a cell surface antigen associated with amplification of an oncogene, comprising the steps of: receiving genomic data of a subject, the genomic data comprising whole genome sequencing (WGS) to identify read depth, heterozygous SNPs, and somatic rearrangement junctions; generating a junction-balanced haplotype graph from the genomic data, the graph having vertices and edges, the vertices corresponding to non-overlapping single-stranded reference genomic intervals and the edges corresponding to variant adjacencies; identifying at least one oncogene amplicon-encoded cell surface protein from the junction-balanced haplotype graph.

In some embodiments, said methods further comprise preparing an immune-oncology therapy that targets the at least one oncogene amplicon-encoded cell surface protein; and administering said immune-oncology therapy to the subject.

In some embodiments, generating the junction-balanced haplotype graph comprises junction balancing a genome graph by assigning integer copy number to each of its vertices according to a junction balanced constraint.

In some embodiments, identifying the at least one oncogene amplicon-encoded cell surface protein comprises applying a predetermined threshold to at least one of Z-score expression, copy number, and co-copy number. In some such embodiments, the methods may further comprise determining a co-copy number for each pair of vertices in the graph.

Identifying the at least one oncogene amplicon-encoded cell surface protein may comprise computing interspersal of surface genes and oncogenes from the set of maximally linear alleles; and applying a predetermined threshold to the interspersal. In some such embodiments, computing interspersal comprises deconvolution of the graph into linear and cyclic alleles; and determining from the linear and cyclic alleles a set of maximally linear alleles.

In some embodimets of the invention disclosed herein, the genomic data comprises (short) read whole genome sequencing (WGS). In certain embodiments, the genomic data comprises WGS and long reads or optical mapping. In other embodiments, the genomic data comprises direct library preparation (DLP+). In some embodiments, the genomic data further comprises optical mapping and chromatin conformation capture.

In some embodiments, the oncogene amplicon comprises at least one known oncogene. In some such embodiments, the at least one oncogene amplicon-encoded cell surface protein resides on a chromosomally integrated amplicon, is linearly interspersed with one or more essential oncogenes, is over-expressed, and clonally co-amplified with one or more of the amplified oncogenes.

In some embodiments, the subject is suffering from cancer. Thus, the genomic data may be derived from a tumor sample. In some such embodiments, the genomic data further comprises genomic data from a matched normal sample.

In some embodiments, the at least one oncogene amplicon-encoded cell surface protein is expressed at the surface of a tumor.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See for example and without limitation, "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000). Similarly, chemistry terms used herein, unless otherwise defined herein, are used according to conventional usage in the art.

All of the above, and any other publications, patents and published patent applications referred to in this application are specifically incorporated by reference herein.

A "patient," "subject," or "individual" are used interchangeably and refer to either a human or a non-human animal. These terms include mammals, such as humans, primates, livestock animals (including bovines, porcines, etc.), companion animals (e.g., canines, felines, etc.) and rodents (e.g., mice and rats).

"Treating" a condition or patient refers to taking steps to obtain beneficial or desired results, including clinical results. As used herein, and as well understood in the art, "treatment" is an approach for obtaining beneficial or desired results, including clinical results. Beneficial or desired clinical results can include, but are not limited to, alleviation or amelioration of one or more symptoms or conditions, diminishment of extent of disease, stabilized (i.e. not worsening) state of disease, preventing spread of disease, delay or slowing of disease progression, amelioration or palliation of the disease state, and remission (whether partial or total), whether detectable or undetectable. "Treatment" can also mean prolonging survival as compared to expected survival if not receiving treatment.

The term "preventing" is art-recognized, and when used in relation to a condition, such as a local recurrence (e.g., pain), a disease such as cancer, a syndrome complex such as heart failure or any other medical condition, is well understood in the art, and includes administration of a composition which reduces the frequency of, or delays the onset of, symptoms of a medical condition in a subject relative to a subject which does not receive the composition. Thus, prevention of cancer includes, for example, reducing the number of detectable cancerous growths in a population of patients receiving a prophylactic treatment relative to an untreated control population, and/or delaying the appearance of detectable cancerous growths in a treated population versus an untreated control population, e.g., by a statistically and/or clinically significant amount.

"Administering" or "administration of" a substance, a compound or an agent to a subject can be carried out using one of a variety of methods known to those skilled in the art. For example, a compound or an agent can be administered, intravenously, arterially, intradermally, intramuscularly, intraperitoneally, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods.

Appropriate methods of administering a substance, a compound or an agent to a subject will also depend, for example, on the age and/or the physical condition of the subject and the chemical and biological properties of the compound or agent (e.g., solubility, digestibility, bioavailability, stability and toxicity). In some embodiments, a compound or an agent is administered orally, e.g., to a subject by ingestion. In some embodiments, the orally administered compound or agent is in an extended release or slow release formulation, or administered using a device for such slow or extended release.

As used herein, the phrase "conjoint administration" refers to any form of administration of two or more different therapeutic agents such that the second agent is administered while the previously administered therapeutic agent is still effective in the body (e.g., the two agents are simultaneously effective in the patient, which may include synergistic effects of the two agents). For example, the different therapeutic compounds can be administered either in the same formulation or in separate formulations, either concomitantly or sequentially. Thus, an individual who receives such treatment can benefit from a combined effect of different therapeutic agents.

A "therapeutically effective amount" or a "therapeutically effective dose" of a drug or agent is an amount of a drug or an agent that, when administered to a subject will have the intended therapeutic effect. The full therapeutic effect does not necessarily occur by administration of one dose, and may occur only after administration of a series of doses. Thus, a therapeutically effective amount may be administered in one or more administrations. The precise effective amount needed for a subject will depend upon, for example, the subject's size, health and age, and the nature and extent of the condition being treated, such as cancer or MDS. The skilled worker can readily determine the effective amount for a given situation by routine experimentation.

The phrase "pharmaceutically acceptable" is art-recognized. In certain embodiments, the term includes compositions, excipients, adjuvants, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The cancer of the disclosed invention can be any cell in a subject undergoing unregulated growth, invasion, or metastasis. Cancer, as disclosed herein, includes both solid and liquid tumors including, for example, brain cancers including glioblastoma, tenosynovial giant cell tumors (TSGCTs), sarcoma, melanoma, mesothelioma, uterine cancer, prostate cancer, kidney cancer, gall bladder cancer, cervical cancer, bladder cancer, ovarian cancer, lung cancers, adenocarcinoma of the lung, thyroid cancer, bladder cancer, breast cancer, esophageal cancer, endometrial cancer, gastric cancer, gastrointestinal cancer, renal cancer, adrenal cancer, mullerian cancer, Merkel carcinoma, acute lymphoblastic cancer, colorectal cancer, pancreatic cancer, liver cancers including hepatocellular carcinoma, AML, DLBCL, lymphomas, multiple myelomas, and the like. In some embodiments, the cancer is a gallbladder cancer, exocrine adenocarcinoma, or apocrine adenocarcinomas.

In some embodiments, the cancer can be any neoplasm or tumor for which radiotherapy or chemotherapy is currently used. Alternatively, the cancer can be a neoplasm or tumor that is not sufficiently sensitive to radiotherapy or chemotherapy using standard methods. Thus, the cancer can be a sarcoma, lymphoma, leukemia, carcinoma, blastoma, or germ cell tumor. A representative but non-limiting list of cancers of the disclosed invention include hepatocellular carcinoma, lymphoma, B cell lymphoma, T cell lymphoma, mycosis fungoides, Hodgkin's Disease, myeloid leukemia, bladder cancer, brain cancer, nervous system cancer, head and neck cancer, squamous cell carcinoma of head and neck, kidney cancer, lung cancers such as small cell lung cancer and non-small cell lung cancer, neuroblastoma/glioblastoma, ovarian cancer, pancreatic cancer, prostate cancer, skin cancer, liver cancer, melanoma, squamous cell carcinomas of the mouth, throat, larynx, and lung, endometrial cancer, cervical cancer, cervical carcinoma, breast cancer, epithelial cancer, renal cancer, genitourinary cancer, pulmonary cancer, esophageal carcinoma, head and neck carcinoma, large bowel cancer, hematopoietic cancers; testicular cancer; colon and rectal cancers, renal cancer, prostatic cancer, and pancreatic cancer.

Immune-Oncology Therapies

Conventional cancer therapy typically surgery, radiotherapy, chemotherapy and targeted therapy. However, immuno-oncology has emerged as a novel and important approach to cancer treatment through the stimulation and/or redirection of the immune system to kill cancer cells. Such therapies include, but are not limited to, adoptive immunotherapies, immune checkpoint inhibitors, antibody-drug conjugates (ADCs), chimeric antigen receptor (CAR) T-cell therapies, bispecific T-cell engagers (BiTEs), and cancer vaccines. Such therapies may be autologous (i.e., derived from the cells of the subject to be treated) or allogeneic (i.e., derived from donor cells).

For example, in certain embodiments, the surface expressed genes identified by the methods disclosed herein (e.g., neoantigens encoded by such genes), may be used in the preparation of a CART-cell therapy, BiTE, ADC, vaccine, or the like, which targets the expressed gene product or fragment thereof. The CART-cell therapy may be, for example (and without limitation), a TRUCK, a Universal CAR, a Self-driving CAR, an Armored CAR, a Self-destruct CAR, a Conditional CAR, a Marked CAR, a TenCAR, a Dual CAR, or a sCAR.

TRUCKs (T cells redirected for universal cytokine killing) co-express a chimeric antigen receptor (CAR) and an antitumor cytokine. Cytokine expression may be constitutive or induced by T cell activation. Targeted by CAR specificity, localized production of pro-inflammatory cytokines recruits endogenous immune cells to tumor sites and may potentiate an antitumor response.

Universal, allogeneic CAR T cells are engineered to no longer express endogenous T cell receptor (TCR) and/or major histocompatibility complex (MHC) molecules, thereby preventing graft-versus-host disease (GVHD) or rejection, respectively.

Self-driving CARs co-express a CAR and a chemokine receptor, which binds to a tumor ligand, thereby enhancing tumor homing.

CAR T cells engineered to be resistant to immunosuppression (Armored CARs) may be genetically modified to no longer express various immune checkpoint molecules (e.g., cytotoxic T lymphocyte-associated antigen 4 (CTLA4) or programmed cell death protein 1 (PD-1)). Exemplary "Knockdown" and "Knockout" techniques include, but are not limited to, RNA interference (RNAi) (e.g., asRNA, miRNA, shRNA, siRNA, etc.) and CRISPR interference (CRISPRi) (e.g., CRISPR-Cas9). In certain embodiments, CAR T cells are engineered to express a dominant-negative form of a checkpoint molecule. In some such embodiments, the extracellular ligand-binding domain (i.e., ectodomain) of the immune checkpoint molecule is fused to a transmembrane membrane in order to compete for ligand binding. For example, the extracellular ligand-binding domain of PD-1 may be fused to a CD8 transmembrane domain, thus competing for PD-1 ligand from the target cell. In some embodiments, CAR T cells are engineered to express an immune checkpoint switch receptor to exploit the inhibitory immune checkpoint ligand present on a target cell. In such embodiments, the extracellular ligand-binding domain of the immune checkpoint molecule is fused to a signaling, stimulatory, and/or co-stimulatory domain. For example, the extracellular ligand-binding domain of PD-1 may be fused to a CD28 domain, thus providing CD28 costimulation while blocking PD-1 signaling. In further embodiments, the CAR T cells may be administered with an aptamer or a monoclonal antibody that blocks immune checkpoint signaling. In some such embodiments, the CAR T cells (e.g., CAR T cell therapy) are combined with a PD-1 blockade method, such as administration with PD-1/PD-L1 antagonistic aptamers or anti-PD-1/PD-L1 antibodies. In preferred embodiments, the CAR T cells and PD-1 pathway-blocking antibodies are administered conjointly. In further embodiments, the CAR T cells are engineered to express or express and secrete an immune checkpoint-blocking antibody, such as anti-PD-1 or anti-PD-L1, or fragments thereof. In yet further embodiments, the CAR T cells are administered with a vector (e.g., an engineered virus) that expresses an immune checkpoint-blocking molecule described herein.

A self-destruct CAR may be designed using RNA delivered by electroporation to encode the CAR. Alternatively, inducible apoptosis of the T cell may be achieved based on ganciclovir binding to thymidine kinase in gene-modified lymphocytes or the more recently described system of activation of human caspase 9 by a small-molecule dimerizer.

A conditional CAR T cell is by default unresponsive, or switched 'off', until the addition of a small molecule to complete the "circuit" (e.g., molecular pathway), enabling full transduction of both signal 1 and signal 2, thereby activating the CAR T cell. Alternatively, T cells may be engineered to express an adaptor-specific receptor with affinity for subsequently administered secondary antibodies directed at target antigen.

Marked CAR T cells express a CAR plus a tumor epitope to which an existing monoclonal antibody agent binds. In the setting of intolerable adverse effects, administration of the monoclonal antibody clears the CAR T cells and alleviates symptoms with no additional off-tumor effects.

A tandem CAR (TanCAR) T cell expresses a single CAR consisting of two linked single-chain variable fragments (scFvs) that have different affinities fused to intracellular co-stimulatory domain(s) and a CD3ζ domain. TanCAR T cell activation is achieved only when target cells co-express both targets.

A dual CAR T cell expresses two separate CARs with different ligand binding targets. By way of non-limiting example, one CAR may include only the CD3ζ domain while the other CAR includes only the co-stimulatory domain(s). In some such embodiments, the dual CAR T cell is activated when both targets are expressed on the tumor.

A safety CAR (sCAR) consists of an extracellular scFv fused to an intracellular inhibitory domain. sCAR T cells co-expressing a standard CAR become activated only when encountering target cells that possess the standard CAR target but lack the sCAR target.

BiTEs, as disclosed herein, may comprise a recombinant bispecific protein. Such recombinant bispecific proteins may be linked scFvs from two different antibodies, one targeting a cell-surface molecule on T cells (for example, CD3ε) and the other targeting a neoantigen identified by the methods disclosed herein. The two scFvs may be linked together by a short flexible linker, for example, and mediate T-cell responses and the killing of tumor cells by binding to the neoantigens and T cells simultaneously. Notably, the T-cell/target cell adherence facilitated by BiTE is independent of MHC haplotype.

Accordingly, in some embodiments of the invention disclosed herein, the immune-oncology therapy comprises chimeric antigen receptor (CAR) T-cells, bispecific T-cell engagers (BiTEs), and/or antibody-drug conjugates (ADCs) that target the at least one oncogene amplicon-encoded cell surface protein. In some such embodiments, the immune-oncology therapy comprises adoptive immunotherapy comprising CTLs targeting at least one oncogene amplicon-encoded cell surface protein. In some embodiments, such methods further comprise identifying an antigenic fragment of the at least one oncogene amplicon-encoded cell surface protein.

In some aspects of the invention, provided herein are methods of preparing an adoptive immunotherapy comprising cytotoxic T-cells (CTLs). In some embodiments, such methods comprise obtaining a sample comprising CTLs and bringing the CTLs into contact with an oncogene amplicon-encoded cell surface protein identified by the methods disclosed herein or fragment thereof, thereby allowing proliferation of activated amplicon-encoded cell surface protein-specific CTLs. In some such embodiments, the sample comprising CTLs is derived from the subject to be treated. In other embodiments, the sample comprising CTLs is derived from a healthy donor.

In some embodiments, the subject has cancer. In some embodiments, the methods described herein may be used to treat any cancerous or pre-cancerous tumor. In some embodiments, the cancer expresses one or more of the CMV epitopes provided herein (e.g., the CMV epitopes listed in Table 1). In some embodiments, the cancer includes a solid tumor. Cancers that may be treated by methods and compositions provided herein include, but are not limited to, cancer cells from the bladder, blood, bone, bone marrow, brain, breast, colon, esophagus, gastrointestine, gum, head, kidney, liver, lung, nasopharynx, neck, ovary, prostate, skin, stomach, testis, tongue, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometrioid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; mammary paget's disease; acinar cell carcinoma; adenosquamous carcinoma; adenocarcinoma w/squamous metaplasia; malignant thymoma; malignant ovarian stromal tumor; malignant thecoma; malignant granulosa cell tumor; and malignant roblastoma; sertoli cell carcinoma; malignant leydig cell tumor; malignant lipid cell tumor; malignant paraganglioma; malignant extra-mammary paraganglioma; pheochromocytoma; glomangiosarcoma; malignant melanoma; amelanotic melanoma; superficial spreading melanoma; malignant melanoma in giant pigmented nevus; epithelioid cell melanoma; malignant blue nevus; sarcoma; fibrosarcoma; malignant fibrous histiocytoma; myxosarcoma; liposarcoma; leiomyosarcoma; rhabdomyosarcoma; embryonal rhabdomyosarcoma; alveolar rhabdomyosarcoma; stromal sarcoma; malignant mixed tumor; mullerian mixed tumor; nephroblastoma; hepatoblastoma; carcinosarcoma; malignant mesenchymoma; malignant brenner tumor; malignant phyllodes tumor; synovial sarcoma; malignant mesothelioma; dysgerminoma; embryonal carcinoma; malignant teratoma; malignant struma ovarii; choriocarcinoma; malignant mesonephroma; hemangiosarcoma; malignant hemangioendothelioma; kaposi's sarcoma; malignant hemangiopericytoma; lymphangiosarcoma; osteosarcoma; juxtacortical osteosarcoma; chondrosarcoma; malignant chondroblastoma; mesenchymal chondrosarcoma; giant cell tumor of bone; ewing's sarcoma; malignant odontogenic tumor; ameloblastic odontosarcoma; malignant ameloblastoma; ameloblastic fibrosarcoma; malignant pinealoma; chordoma; malignant glioma; ependymoma; astrocytoma; protoplasmic astrocytoma; fibrillary astrocytoma; astroblastoma; glioblastoma; glioblastoma multiforme (GBM); oligodendroglioma; oligodendroblastoma; primitive neuroectodermal; cerebellar sarcoma; ganglioneuroblastoma; neuroblastoma; retinoblastoma; olfactory neurogenic tumor; malignant meningioma; neurofibrosarcoma; malignant neurilemmoma; malignant granular cell tumor; malignant lymphoma; Hodgkin's disease; Hodgkin's lymphoma; paragranuloma; small lymphocytic malignant lymphoma; diffuse large cell malignant lymphoma; follicular malignant lymphoma; mycosis fungoides; other specified non-Hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia.

In some preferred embodiments, the subject is suffering from a cancer selected from: pancreatic cancer, skin cancer, acute myeloid leukemia, metastatic carcinoma, prostate cancer, adrenal cancer, mullerian cancer, uterine cancer, kidney cancer, gall bladder cancer, cervical cancer, bladder cancer, ovarian cancer, breast cancer, head and neck cancer, esophageal cancer, lung cancer, liver cancer, colon cancer, gastrointestinal cancer, colorectal cancer, acute lymphoblastic cancer, lymphoma, sarcoma, melanoma and brain cancer. In some such embodiments, the subject is suffering from a solid tumor.

In certain aspects, provided herein is a computer program product for identifying a cell surface antigen associated with amplification of an oncogene, the computer program product comprising a computer readable storage medium having program instructions embodied therewith, the program instructions executable by a processor to cause the processor to perform the methods disclosed herein.

EXAMPLES

The invention now being generally described, it will be more readily understood by reference to the following examples, which are included merely for purposes of illustration of certain aspects and embodiments of the present invention, and are not intended to limit the invention.

Example 1: Genome Graphs Reveal Complex Amplicon Structure

Figure 2:
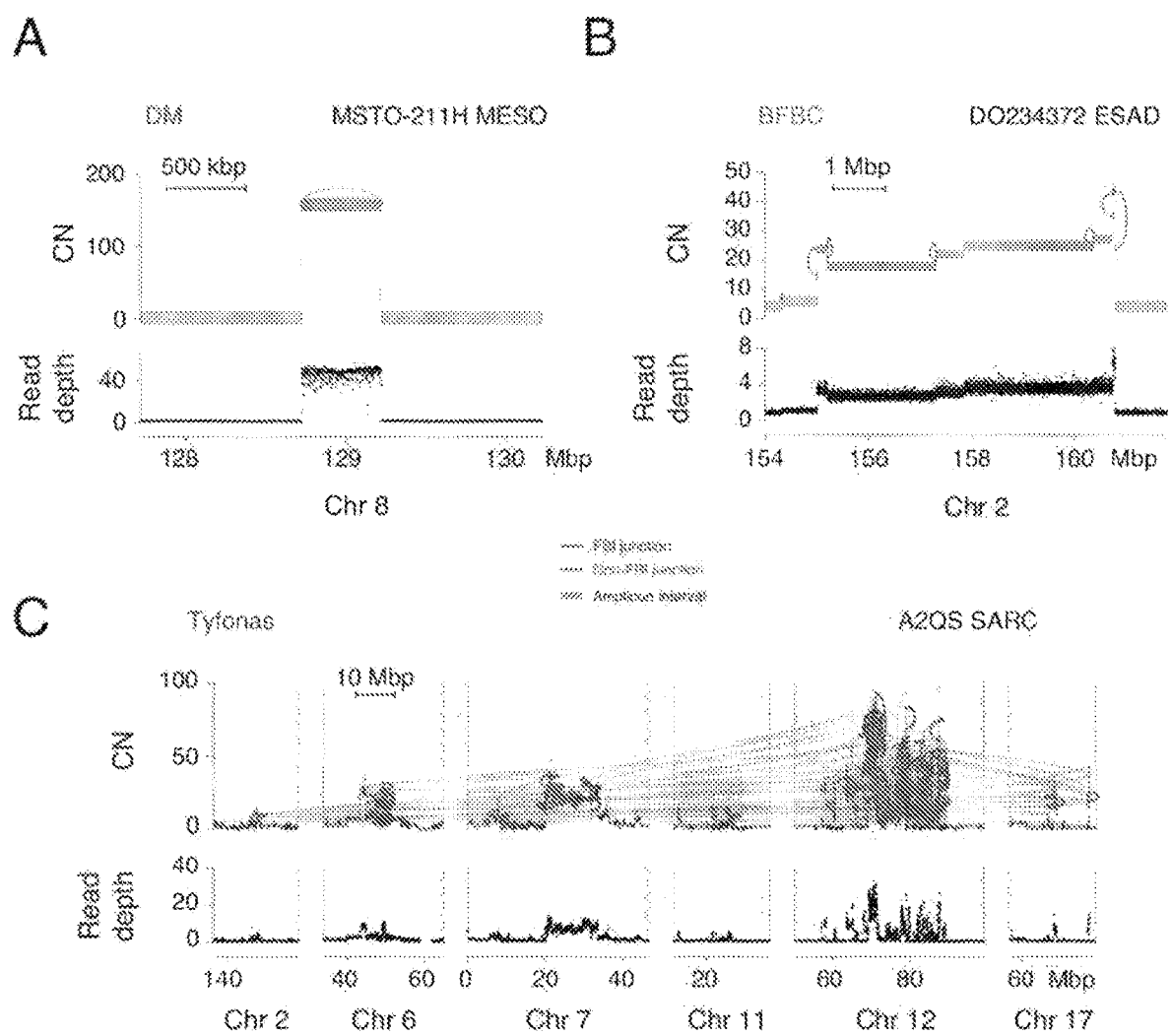
FIG. 2 shows the distinct classes of complex amplicon structures. Example amplicon calls from the disclosed algorithmic methods enable amplicons to be classified and reconstructed from WGS. (A) Double minutes (DMs) comprise extrachromosomal circles that are predicted to be unstable in their dosage and structure. (B) Breakage fusion bridge cycles (BFBCs) and (C) Tyfonas are predicted to be stable and chromosomally integrated. Visualizations represent junction-balanced genome graphs comprising event-associated (pink) and nearby (gray) interval nodes joined by rearrangement junction edges whose y axis value represents their copy number (CN). Scatter plots show normalized binned read-depth.
Figure 3:
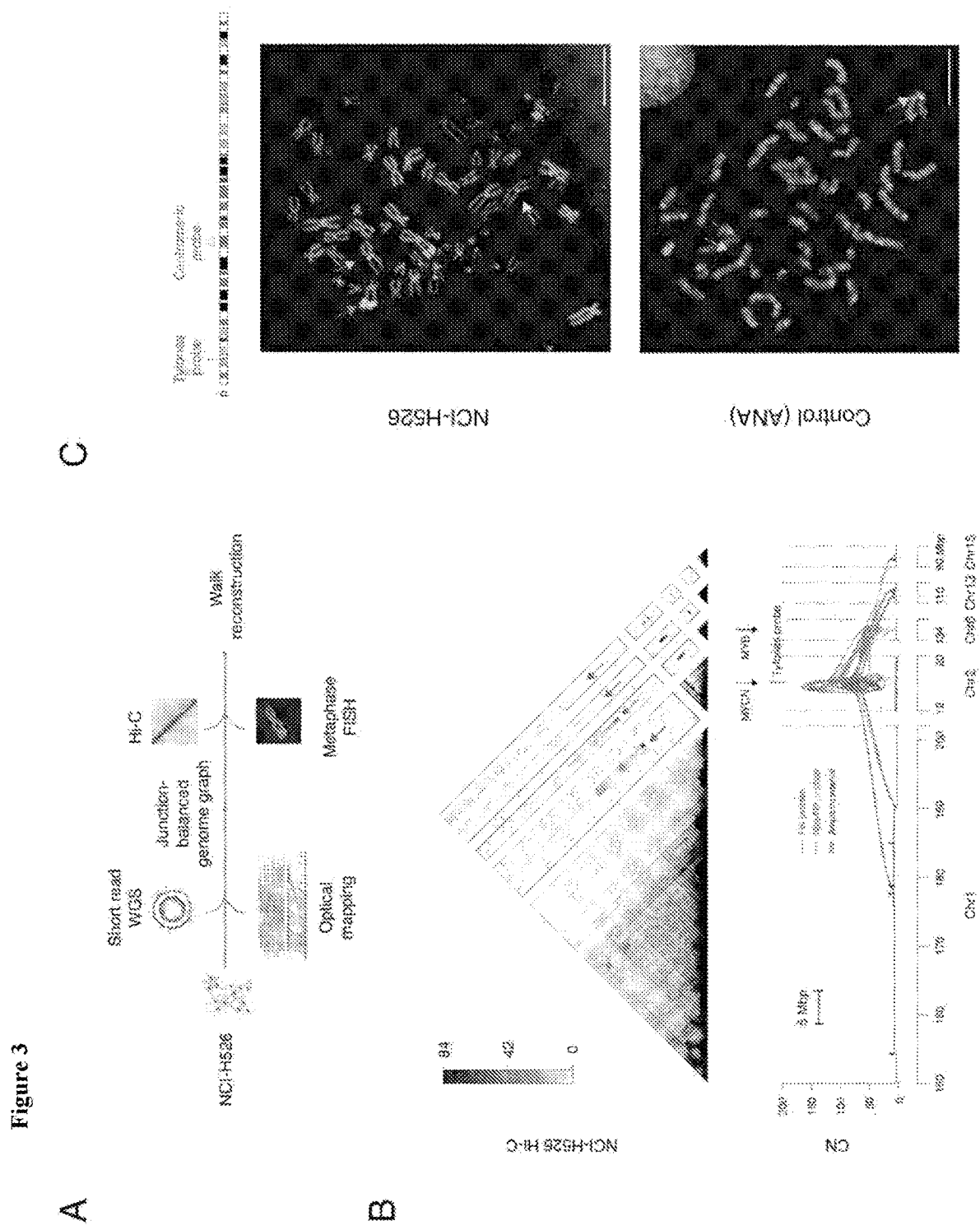
FIG. 3 shows confirmation of tyfonas integration with long range genome profiling and FISH. (A) Outline of multi-modal approach to reconstruct tyfonas alleles in a small cell lung cancer cell line NCI-H526 using WGS, Bionano optical mapping, and Hi-C[5]. (B) WGS/Bionano genome graph shows that the tyfonas co-amplifies NMYC and MYB. Superimposed Hi-C data shows an abundance of 3D contacts between the center of the tyfonas amplicon on 2 and a long region of 1q, consistent with chromosomal integration. (C) Homogenously staining region pattern on metaphase FISH indicates that the tyfonas is chromosomally integrated.

Previous work has pioneered the application of genome graphs to capture complex cancer genome structure[5,11,12]. While copy number alterations and rearrangement are two facets of a single genome structure, they are usually considered separately. To address this gap, junction balance analysis was developed (github.com/mskilab/JaBbA), a probabilistic model that balances copy number across the nodes (intervals) and edges (junctions) of a genome graph. Analysis of genome graphs (github.com/mskilab/gGnome) enables rigorous characterization of known classes of clonal and/or ancestral structural variants (e.g., double minutes, DMs; breakage fusion bridge cycles, BFBCs, FIG. 2A-B) and reconstruction of complex and amplified alleles in conjunction with long molecule data. Applying these approaches5, a new class of clonal chromosomally integrated amplicons called tyfonas was nominated (FIG. 2C) which comprises massive clusters of high copy and foldback inversion junctions. Tyfonas are found in ~2-3% of cancers but are particularly enriched in de-differentiated liposarcoma (DDLPS, ~80% of cases) and acral melanoma (~40%). Tyfonas frequently (92% of loci) amplify one or more oncogenes in addition to many passenger genes to over 50 copies per cell. 80% of DDLPSs (e.g., FIGS. 2C, Case A2QS), harbor a tyfonas in chromosome 12, which decades of cytogenetic studies have shown to adopt a ring structure in DDLPS tumors13. Preliminary Hi-C and Bionano optical mapping data suggest that non-DDLPS tyfonas are also clonal, stable, and chromosomally integrated (FIG. 3), corresponding to a clonal homogenously staining pattern on metaphase FISH (FIG. 3C).

Example 2: Prediction of Amplicon Integration and Structure

Methods to determine the integration status and detailed structure (including surface antigen gene distribution) of amplicons from short read, long molecule, and Hi-C profiles were developed. This inference forms the core of the therapeutic strategy described in FIG. 1 and the associated companion diagnostic that will help nominate patients for whom such therapies may be effective.

Figure 4:
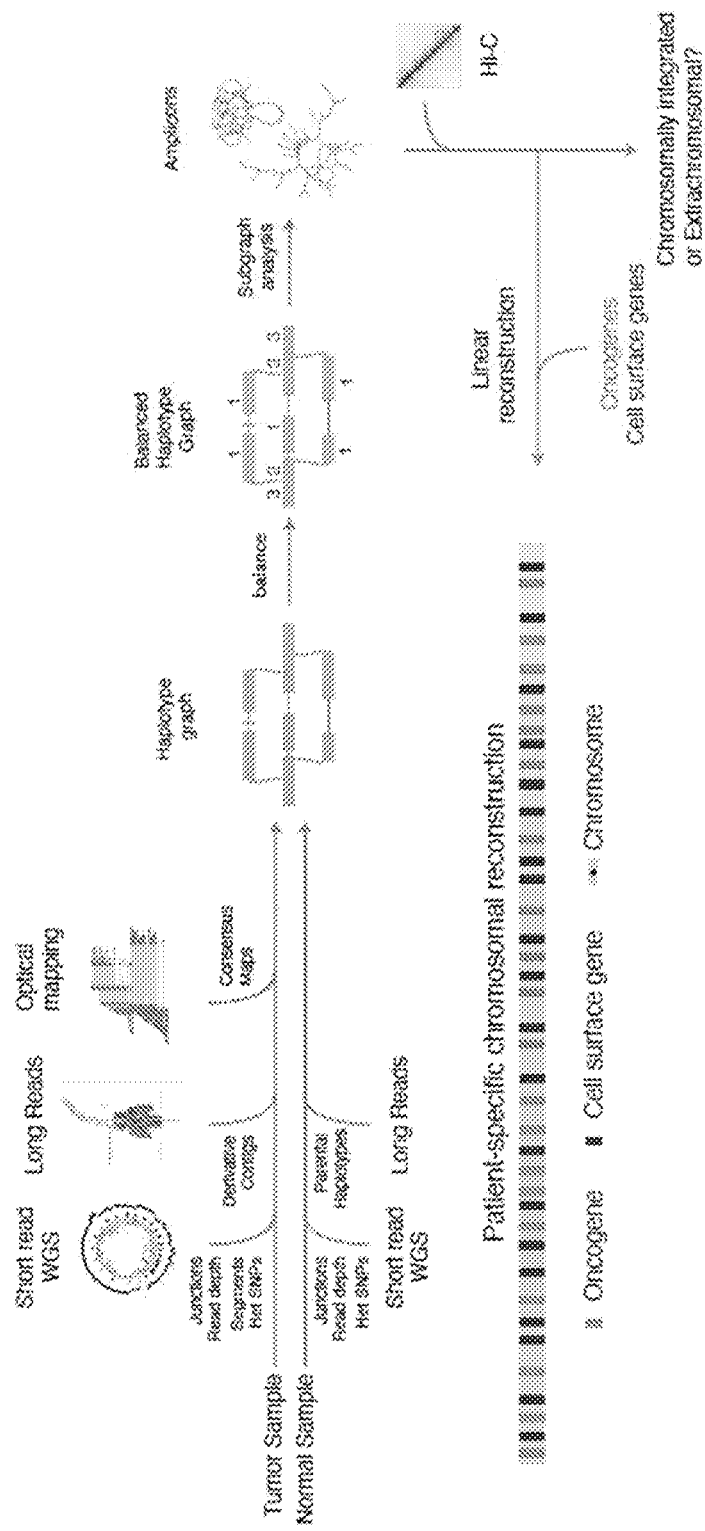
FIG. 4 shows a schematic of a method for patient-specific prediction of amplicon passengers as IO targets. A patient's tumor and matched normal sample are analyzed with short read whole genome sequencing (WGS) to identify read depth, heterozygous SNPs, and somatic rearrangement junctions. Optional long read data is locally assembled to identify derivative rearranged contigs and infer parental hapotypes in the matched normal sample. Bionano optical mapping is optionally used to assemble "consensus maps" from long molecules (median ~300 Kbp length). These signals are integrated into a haplotype graph, which is balanced. Analysis of topology and node/junction copy number across subgraphs, with or without Hi-C data is used to determine the integrated vs. extrachromosomal status for amplicons. Integrated amplicons undergo linear reconstruction to identify elucidate the genomic structure with respect to essential oncogenes and co-amplified cell surface genes that encode candidate protein antigens to determine eligibility for specific IO therapies.

This approach substantially extends previous studies,[5] specifically for the purpose of identifying surface antigen immune-oncology targets. Unbalanced haplotype graphs were built from a preliminary set of genomic segments (inferred by CBS[14]), junctions (inferred from short reads by SvaBA[15]), consensus maps (from Bionano Solve Rare variant pipeline[16]), and purity and ploidy (inferred by ASCAT[17], Sequenza[18]) (FIG. 4). To balance these graphs a new algorithm was developed (gGnome::balance) that assigns copy number to the nodes and edges of these haplotype graphs, the former of which represent copies of rearranged parental alleles.

Using the subgraph features of these balanced haplotype graphs amplicons can be diagnosed as being integrated or extrachromosomal on the basis of junction copy number and allelic node topology. This decision is based on the amplitude, topology, and copy number of amplified subgraphs in the balanced haplotype graph. Given Hi-C data from the same tumor, integration status can also be directly assessed through the presence or absence of focal "off diagonal" contacts linking the amplicon to a candidate chromosomal integration site.

Additionally, these genome graphs can be "unrolled" to infer the linear allelic structure of these loci (FIG. 4), and particularly determine the relative arrangement of oncogene and cell surface gene copies. Through additional analysis of this inferred linear structure, whether a given patient harbors an amplified surface antigen that is physically interspersed on a chromosome with one or more essential oncogenes can also be determined.

These analyses can be done with short read whole genome sequencing (WGS) with or without the presence of long molecule data (Bionano optical mapping, Oxford Nanopore Technologies long reads) or Hi-C. A key question in the development of future clinically applicable companion genomic diagnostics for immune-oncology therapy strategies will be to determine what is the most scalable and cost effective approach for nominate surface antigens in a given patient.

Figure 5:
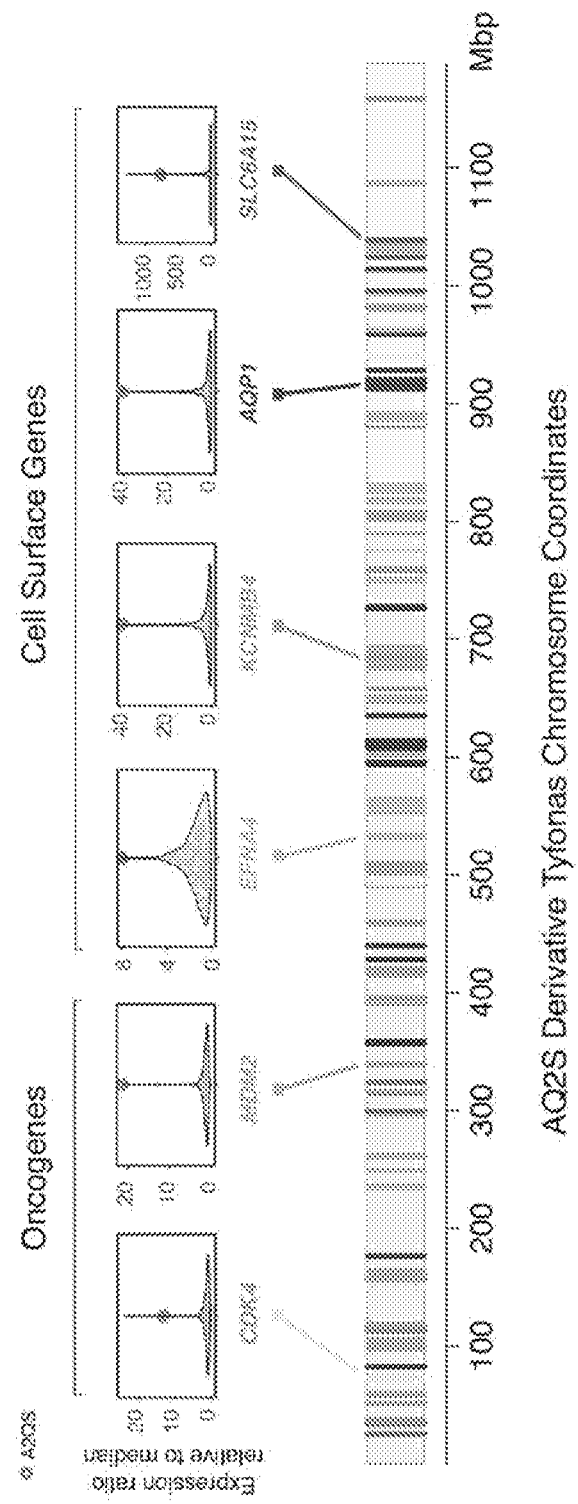
FIG. 5 depicts tyfonas encoding over-expressed cell surface antigens. Linear reconstruction of a DDLPS tyfonas allele from case A2QS (FIG. 2C) which amplifies tens of copies of two oncogenes (CDK4, MDM2) that are physically interspersed with tens of copies of genes encoding four cell surface proteins (EFNA4, KCNMB4, AQP1, SLC6A15). These genes are color coded and plotted in derivative chromosomal coordinates, alongside their expression in A2QS (red) relative to the pan-cancer median. Gene labels are connected by a line to one (of many) copies of that gene on the tyfonas chromosome. The interspersing of cell surface genes and oncogenes is predicted to create an evolutionary dilemma for these tumors given sufficient immune pressure.

Example 3: Integrated Amplicons May Provide a Stable and Clonal Source of Targetable Antigens Applying the algorithms disclosed herein to pan-cancer short read WGS data reveals that there are many potential candidates for this novel immune-oncology strategy, both within and outside of DDLPS. Linear reconstruction (FIG. 5) of the DDLPS tyfonas from FIG. 2 (Case A2QS) reveals that amplified oncogenes (CDK4, MDM2) are interspersed with tens of copies of four genes encoding cell surface proteins (EFNA4, KCNMB4, AQP1, SLC6A15), each over-expressed from 8 to over 500-fold above its respective pan-cancer median (FIG. 3). This massive over-expression is predicted to give rise to high surface antigen densities that will provide a natural CAR-T target. The detailed "origami" structure of the derivative chromosome implies that such tumors would be unable to delete or silence antigen expression without jeopardizing the activity of essential oncogenes given an anti-surface protein immune-oncology therapy (e.g., CAR-T, BITE) (FIG. 1).

Figure 6:
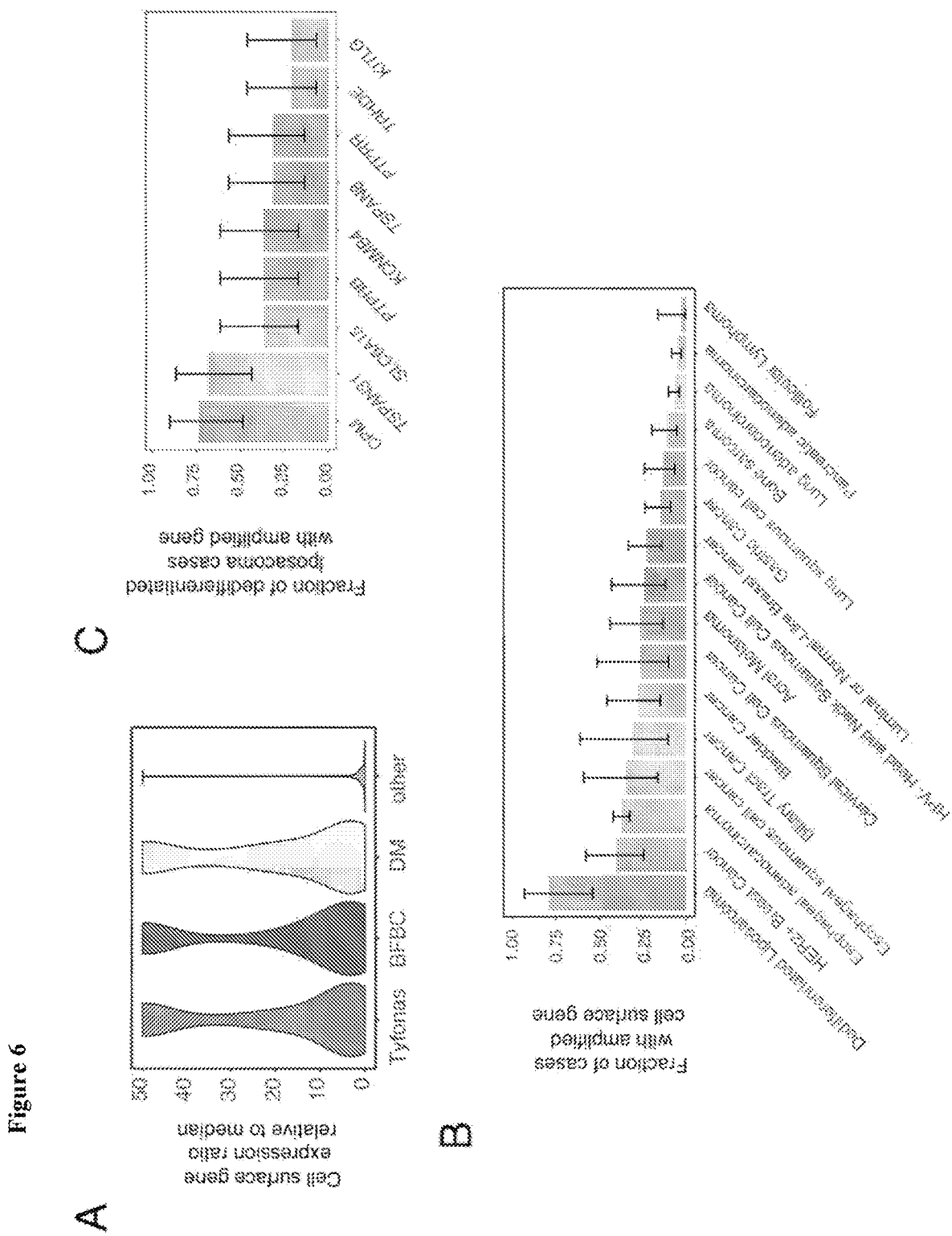
FIG. 6 depicts a landscape of possible amplicon encoded surface antigen targets in cancer. (A) Pan-cancer expression of cell surface genes co-amplified with essential oncogenes on tyfonas, BFBCs, DMs, and background across TCGA. Expression is shown as a ratio to the pan-cancer median. (B) Tumor subtypes most frequently found to harbor a BFBC or tyfonas encoding an amplified cell surface gene. (C) Cell surface genes most frequently co-amplified with CDK4 and MDM2 in chromosome 12 tyfonas in DDLPS.

In addition to tyfonas, BFBCs (7% of cancers) and DMs (5% of cancers) co-amplify and over-express oncogenes and cell surface genes (FIG. 6A). BFBCs also comprise chromosomally integrated amplicons with tyfonas-like origami structures, which arise from repeated breakage and fusion of chromosome ends across multiple cell cycles[19]. In contrast, DMs are plastic and heterogenous in their dosage and structure and distribute gene copies across many independently segregating extrachromosomal circles[20]. As a result, it is predicted that tyfonas and BFBCs give rise to stable antigens while DMs permit antigen loss following immune-oncology therapy that targets amplicon-encoded surface antigens (FIG. 1). DDLPS is attractive as a pre-clinical proof of concept given the striking recurrence of tyfonas on chromosome 12, resulting in several frequently amplified IO targets (FIG. 6C).

Figure 7:
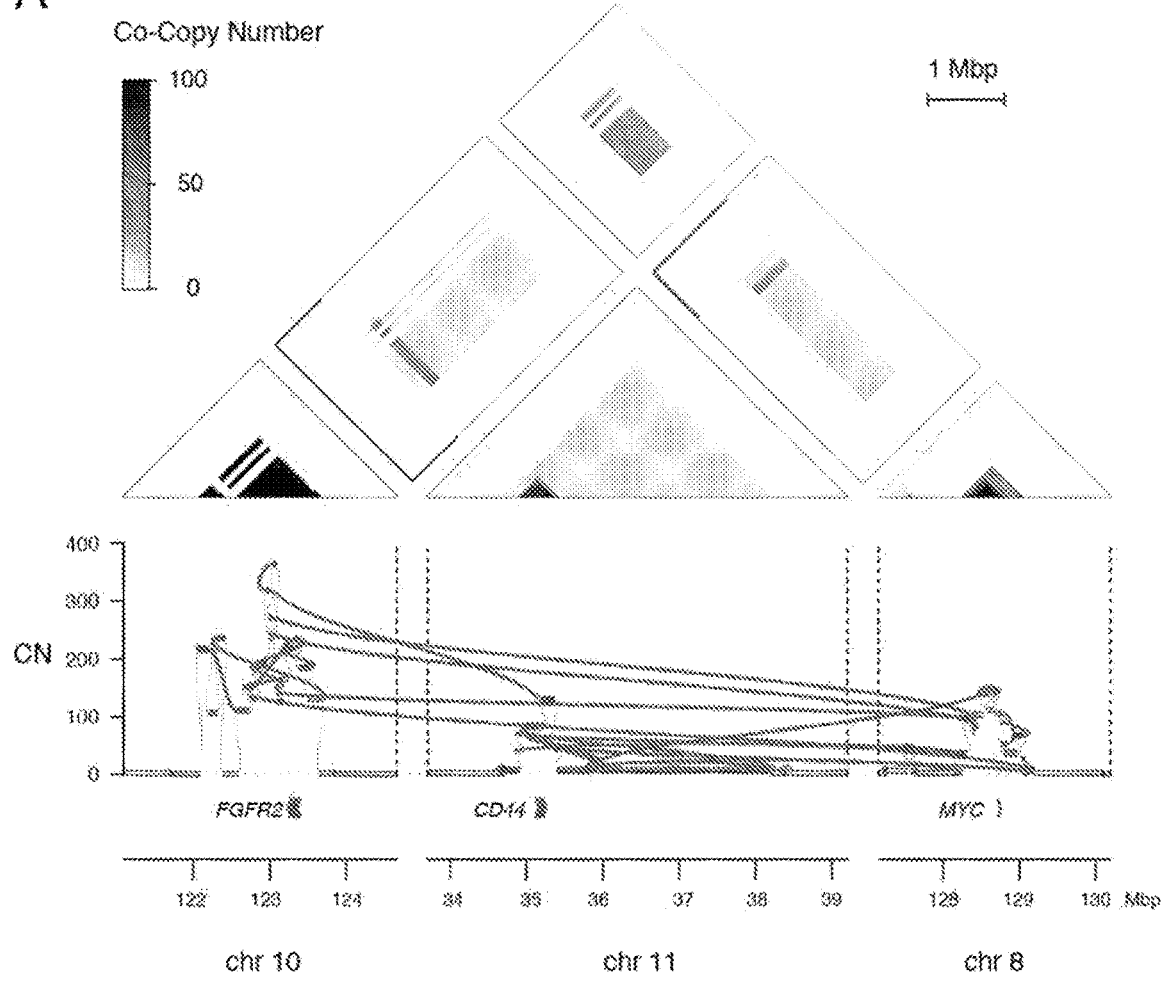
FIG. 7 depicts a complex amplification of two oncogenes (MYC and CDK4) that also over-expresses the targetable surface antigen CD44 in SNU-16, a cancer cell line grown from the intra-abdominal metastases of a 33-year old patient with stomach cancer. (A) An amplified subgraph of the genome graph (bottom) and co-copy number analysis (triangular heatmap above) shows co-amplification of at least 50 copies of the MYC, CDK4, and CD44 genes. (B-C) Density plot showing FGFR2 and CD44 gene expression across a set of 1036 cancer cell lines, with the vertical red line depicting the expression of SNU-16. (C) Flow cytometry using a fluorescent antibody against the surface protein CD44 showing 5-100 fold higher expression of CD44 in SNU-16 cells relative to three other cancer and non-cancer cell lines.
Figure 7:
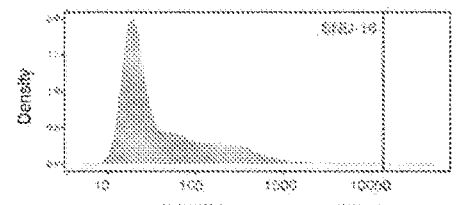
Figure 7:
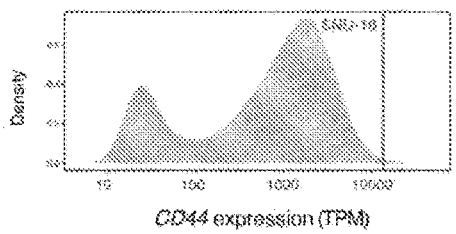
Figure 7:
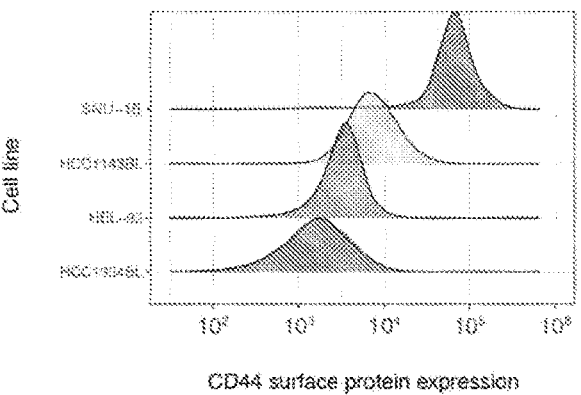

Beyond DDLPS, many additional cancer types were found where this immune-oncology approach could frequently apply, including breast, esophageal, bladder, cervical squamous cell, and skin cancer (>20% of each with oncogene and surface antigen co-amplification) (FIG. 6B). This also includes a smaller but substantial fraction of most other common cancer types (including lung and gastric cancer) which often co-amplify intracellular cancer genes and surface genes, sometimes giving rise to multiple targets in the same patient. As an example, the gastric cancer cell line SNU-16 amplifies the undruggable intracellular gene MYC, the oncogene FGFR2 which encodes a surface protein essential for tumor growth, and the gene CD44 which encodes a non-oncogenic surface antigen (FIG. 7A). The co-amplification of CD44 with these two oncogenes is revealed through the analysis of co-copy number patterns on genome graphs (FIG. 7A). RNA-seq analysis also shows that both CD44 and FGFR2 genes are highly expressed in the SNU-16 cell line relative to a set of 1036 other cancer cell lines (FIG. 7B-). Flow cytometry confirms that CD44 is expressed at the SNU-16 cell surface at a high level, exceeding the surface expression of three other cell lines by 8-100 fold (FIG. 7C). These data indicate that CD44 would be an attractive immunotherapy target in this patient, in conjunction with immunotherapy or targeted therapy against FGFR2.

The disclosure provided herein significantly extends previously published work[5,11,12]. At present, studies relating to amplicon reconstruction[20,21,22] are focused strictly on the detection of extrachromosomal DNA in cancer. Provided herein is the reconstruction of chromosomally integrated DNA and its therapeutic implications, which is without precedent.

Example 4: Preliminary Genomic Data Analysis

The methods described herein involve
1) (short read) WGS of tumor and normal and RNA-seq of the tumor, either alone or in combination with other technologies, including
2) optical mapping,
3) chromatin conformation capture techniques such as Hi-C, and
4) direct library preparation (DLP+).

WGS analyses disclosed herein all employ the inference of a junction-balanced genome graph (G; κ) from a tumor and matched normal short read (Illumina) whole genome sequence, whose inference is described in.[5] Each edge in the genome graph represents an adjacency or (physically) a 3'-5' phosphodiester bond joining two reference adjacent or non-adjacent DNA locations in the human reference genome. Briefly, the graph G=(V, E) is constructed from (CBS derived) genomic segments inferred from purity/ploidy corrected and normalized binned tumor read depth. The edges E(G) represent variant adjacencies (also called junctions) inferred through paired-end, split read, and local assembly analysis of tumor and matched normal WGS reads. Each vertex v in the graph represents a non-overlapping single-stranded reference genomic interval. Every vertex v and edge e has a reverse complement $-(v)$ and $-(e)$, respectively, in G.

Genome graphs are junction balanced by assigning integer copy number to each of the vertices V(G) and edges E(G) of G via function κ: $V(G) \cup E(G) \to \mathbb{N}^+$. This function satisfies a junction balanced constraint which ensures that sum of copy number κ(e) of edges $e \in E^-(v)$ entering (or similarly leaving, i.e., $e \in E^+(v)$) a node $v \in V(G)$ is equal to the node copy number κ(v). In addition $\kappa(v) = \kappa(-(v))$ and $\kappa(e) = \kappa(-(e))$ for every vertex e and edge e in G. The graph contains both reference $E_R(G) \subset E(G)$ and variant edges $E_A(G) \subset E(G)$ that join pairs of coordinates that are adjacent or non-adjacent, respectively, in the reference genome. The basic notation and concepts for junction balanced genome graphs are described in more detail in the prior art, and incorporated by reference herein, in its entirety.[5] The genome graph data structure and associated operations have been implemented in the R package gGnome (github.com/mskilab/gGnome).

For the purposes of the algorithms described herein, the genome graph was additionally partitioned (i.e. by splitting nodes with reference edges using the gGraph::disjoin method in the gGnome package) to include the boundaries of a set of oncogene $O \subset V(G)$ and surface gene $S \subset V(G)$ nodes. Oncogenes were defined using the cancer gene census available online (cancer.sanger.ac.uk/census) from the Sanger Institute (genes annotated with Molecular Genetics =Dom, Role in Cancer=oncogene, Mutation Types including "A"). Cell surface genes were defined using previously published annotations.[23] Given the above formulation, tumor RNA-seq data additionally allows one to associate each oncogene or surface gene vertex $v \in S \cup O \subset V(G)$ with an expression Z score $Z(v) \in \mathbb{R}$ relative to other tumors (of the same type, or pan-cancer).

Example 5: Amplicon Passenger Inference from WGS and RNA-Seq Only

Given a junction balanced genome graph (G; κ), the goal is to identify surface genes $Sa \subset S$ that are co-amplified and over-expressed with one or more amplified oncogenes $Oa \subset O$ on a clonal and chromosomally integrated locus, satisfying the criteria for identifying one or more surface antigen genes (i.e., criteria a-e). WGS and RNA-seq will allow assessment of over-expression and clonality, but only give indirect evidence for residence on a chromosomally integrated amplicon, co-amplification, and linear interspersion with one or more essential oncogenes. This is because the short range of WGS (150 bp) provides limited ability to unambiguously reconstruct long alleles and thus directly determine the arrangement of genes with respect to each other on an amplicon or the orientation of the amplicon relative to (centromeric) chromosomes. In the absence of more direct evidence of contiguity and chromosomal integration (i.e., long molecules, chromatin conformation capture), co-amplification can be assessed through analysis of (G; κ). To do so an unambiguously computable quantity called co-copy number is defined, which represents the maximum number of times two distinct loci (e.g., oncogenes and surface genes) can be adjacent on the same allele in a genome, given a junction balanced genome graph (G; κ). Co-copy number can be computed across all vertex pairs in the graph (G; κ) using the CoCopy algorithm (Algorithm 1), which returns the function $\gamma: V(G) \times V(G) \to \mathbb{N}^+$ mapping vertex pairs to their co-copy number.

| Algorithm 1 CoCopy |
| --- |
| 1: procedure COCOPY(G, κ) ▷ Returns $\gamma : V(G) \times V(G) \to \mathbb{N}^+$ |
| 2:   $\gamma : (v, w) \mapsto 0, \forall_{v,w \in V(G)}$ ▷ Initialize γ to 0 for all vertex pairs |
| 3:   $U = \{\kappa(e) \mid e \in E(G)\}$ ▷ Sequence of unique edge copy numbers |
| 4:   $(u_k) \leftarrow \text{Sort}(U)$ |
| 5:   for $u_k, k \in 1,\ldots,\|U\|$ do |
| 6:     $G' \leftarrow (V(G), \{e \in E(G) \mid e \geq u_k\})$ ▷ subgraph of high copy edges |
| 7:     $C \leftarrow \text{connectedComponents}(G')$ ▷ collection of subsets of V (G') |
| 8:     for $C \in C$ do |
| 9:       for $v, w \in C$ do |
| 10:         $\gamma(v, w) \leftarrow u_k$ |
| 11:       end for |
| 12:     end for |
| 13:   end for |
| 14:   return γ |
| 15: end procedure |

Given these results, specific interest lies in identifying over-expressed surface genes that have a high co-copy number (i.e., above some threshold c) with an amplified oncogene. Surface gene vertices $s \in S$ are then identified with expression $Z(s) > z$ and copy number $\kappa(s) > c_s$ such that there exists an oncogene $o \in O$ with $\kappa(o) > c_o$ such that $\gamma(o,s) > c$, given some Z-score expression threshold z, copy number thresholds $c_s$, $c_o$, and co-copy number threshold d (four hyperparameters). Surface genes that pass these thresholds are inferred to satisfy criteria (a) and (c-d) for an antigen candidate.

To satisfy criterion b (residence on a chromosomally integrated amplicon) graph analyses will be employed in previous work[5], which can indirectly distinguish between chromosomally integrated and extrachromosomal amplicons. Published results, show roughly half of amplicons have structures consistent with double minutes, and thus are likely not chromosomally integrated.[5] Since such amplicons are likely evolutionarily labile and subject to changes in dosage and structure, extra-chromosomally co-amplified surface genes are likely to be poor antigen candidates. Therefore to determine (d; co-amplification) any surface antigen candidates that are predicted by gGnome to reside on a double minute will be removed.

Finally, given a chromosomally integrated amplicon, its linear allelic structure (criterion e) can be inferred through a greedy approach. This enables a parsimonious deconvolution of a graph into linear and cyclic alleles that maximize the number of alternate alleles per walk. For this purpose, the Peel algorithm (Algorithm 2) was developed to return a set of cycles and walks.

---

Algorithm 2 Peel

```
 1: procedure PEEL(G, κ)                  ▷ Returns multiset of cycles C and paths P
 2:    C, L ← { }
 3:    while Σ_{e∈E(G)} κ(e) + Σ_{v∈V_I} κ(v) > 0 do
 4:       f ← maxFlow(G, κ)
 5:       for h ∈ DFS(f) do               ▷ DFS returns a collection of walks
 6:          for v ∈ V(h) do
 7:             κ(v) ← κ(v) − 1
 8:             κ(v̄) ← κ(v̄) − 1
 9:          end for
10:          for e ∈ E(h) do
11:             κ(e) ← κ(e) − 1
12:             κ(ē) ← κ(ē) − 1
13:          end for
14           if (tail(h), head(h)) ∈ f then   ▷ h is a cycle
15:             C ← C + {h}
16:          else                              ▷ h is a path
17:             L ← L + {h}
18:          end if
19:       end for
20:    end while
21:    return C, L
22: end procedure
```

---

Peel employs a function $f = \mathrm{maxFlow}(G, \kappa)$ which returns $f \subseteq E(G)$, the solution to the mixed integer program:

argmax $$f \subseteq E(G) \; |f \cup E_f(G)|$$

subject to:

$$\sum_{e \in f} \sum_{v \in V(G)} d(v, e, \kappa) = 0$$

$$\sum_{e \in f} [\![d(v, e, \kappa) < 0]\!] = \sum_{e \in f} [\![d(v, e, \kappa) < 0]\!] \leq 1, \forall_{v \in V_I}$$

where d is defined for a vertex v and edge e pair v, e as:

$$d(v, e, \kappa) = \begin{cases} -1, & \text{if } e \in E^-(v) \wedge \kappa(e) > 0 \\ 1, & \text{if } e \in E^+(v) \wedge \kappa(e) > 0 \\ 0, & \text{otherwise} \end{cases}$$

The walks generated by Peel are further consolidated into a set of maximally linear alleles via Consolidate. Across this set of walks (strings of vertices and edges in G), statistics can be computed that measure the interspersal of surface genes and oncogenes S, $O \subset V(G)$ across these walks. A simple metric of interspersal is the maximum number of instances of surface receptor flanked by oncogenes on both sides within a given distance threshold (e.g., 500 kbp) across all walks. This provides the final metric to assess condition (e).

Example 6: Amplicon Passenger Inference from Long Reads or Optical Mapping

Standard WGS produces graphs with many loose ends (missing junctions, including at critical copy number changes) and do not allow for phasing individual rearrangement junctions into long range haplotypes. This can limit the ability to compute co-copy number and resolve complex allelic structures, particularly at amplicons. Through the employment of long reads (Oxford Nanopore Technologies) or optical mapping (BioNano Genomics), the number of loose ends can be reduced (by being able to map junctions in repetitive genomic regions) and which rearrangement junctions occurring nearby on the same molecule vs. distant/separate molecules can be identified. This analysis is approached through the application of a new data structure called a haplotype graph and the development of mixed integer programming approaches to balance these graphs called Haplotype Balance Analysis (HaBbA). Analysis of co-copy number and peeling of long read or optical mapping-derived haplotype graphs enables more accurate amplicon reconstructions, leading to the nomination of additional surface antigen candidates and the correct inference of interspersal statistics.

Example 7: Amplicon Passenger Inference from Chromosomal Conformation Capture

While short read WGS provides a reasonable guess with respect to which amplicons are chromosomally integrated vs. extrachromosomal, the three dimensional contact information provided by chromosomal capture assays in combination with novel algorithms described below can definitively distinguish between such amplicons. These analyses integrate data from the standard assay for genome-wide chromosome conformation capture (Hi-C) or more recent Oxford Nanopore based technologies (Pore-C) with genome graph analyses described above for standard WGS. The goal of these analyses is to
  (1) comprehensively define amplicons across the tumor genome, and
  (2) identify an integration site for a candidate amplicon (i.e., those harboring cell surface receptors) through the analysis of 3D contact patterns.

Example 8: Amplicon Passenger Inference from DLP+

Advanced cancers can be highly heterogenous. The ideal cell surface antigen for solid tumor immunotherapy should be clonal in a tumor, i.e., ancestral to all subclones. DLP+ is a recently developed technology that enables single cell WGS at an unprecedented scale across a phylogeny of thousands of cells per experiment.[26] While the bulk WGS analysis approaches (JaBbA) enable the estimation of clonal copy number, it is possible that certain particularly high level amplicons may be only present in a subset of cells. To increase the accuracy of clonal surface antigen nomination from patient's tumors, an algorithm is proposed that integrates the topology of bulk WGS genome graphs across the DLP+ phylogeny to identify clonally co-amplified cell surface antigens.

The identification of biological markers or antigen targets associated with malignancy and/or resistance to therapy by the methods disclosed herein allows for diagnosis, prognosis, as well as efficient and specific therapeutic interventions. For example and without limitation, the identification of neoantigens may lead to novel therapeutic targets. Similarly, the identification of amplicon passengers may allow the prediction of pathological response or resistance to candidate therapeutics, potentially allowing for patient stratification and personalized therapeutic regimens.

Computer-Implemented Methods

Figure 8:
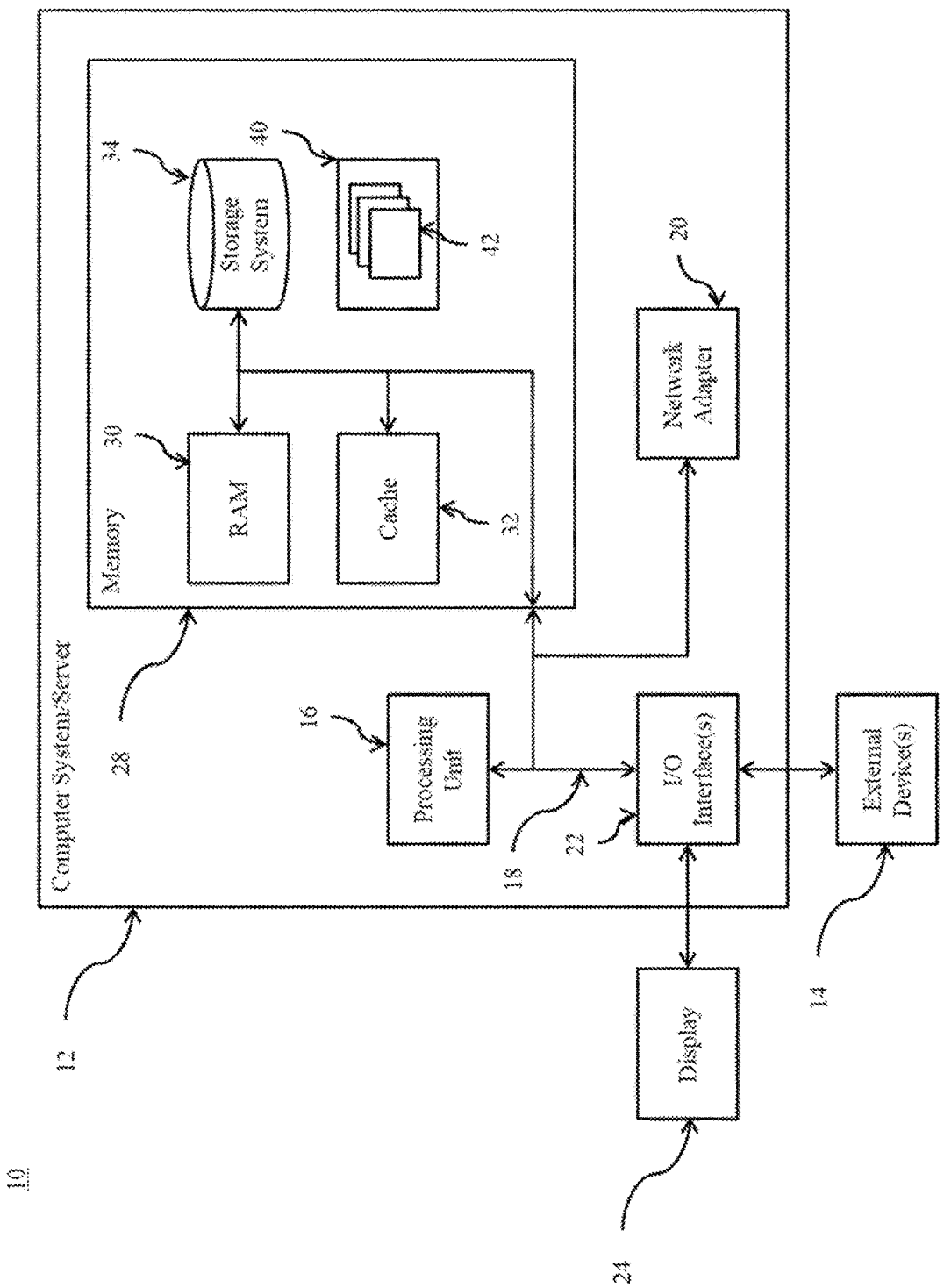
FIG. 8 depicts an exemplary computing node according to embodiments of the present disclosure.

Referring now to FIG. 8, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

REFERENCES

1. June, C. H. & Sadelain, M. Chimeric antigen receptor therapy. N. Engl. J. Med. 379, 64-73 (2018).

2. Goebeler, M.-E. & Bargou, R. C. T cell-engaging therapies-BiTEs and beyond. Nat. Rev. Clin. Oncol. 17, 418-434 (2020).
3. Drago, J. Z., Modi, S. & Chandarlapaty, S. Unlocking the potential of antibody-drug conjugates for cancer therapy. Nat. Rev. Clin. Oncol. 18, 327-344 (2021).
4. Rafiq, S., Hackett, C. S. & Brentjens, R. J. Engineering strategies to overcome the current roadblocks in CAR T cell therapy. Nat. Rev. Clin. Oncol. 17, 147-167 (2020).
5. Hadi, K. et al. Distinct classes of complex structural variation uncovered across thousands of cancer genome graphs. Cell 183, 197-210.e32 (2020).
6. Konieczkowski, D. J., Johannessen, C. M. & Garraway, L. A. A convergence-based framework for cancer drug resistance. Cancer Cell 33, 801-815 (2018).
7. Turajlic, S., Sottoriva, A., Graham, T. & Swanton, C. Resolving genetic heterogeneity in cancer. Nat. Rev. Genet. 20, 404-416 (2019).
8. Sansregret, L., Vanhaesebroeck, B. & Swanton, C. Determinants and clinical implications of chromosomal instability in cancer. Nat. Rev. Clin. Oncol. 15, 139-150 (2018).
9. Bakhoum, S. F. & Cantley, L. C. The multifaceted role of chromosomal instability in cancer and its microenvironment. Cell 174, 1347-1360 (2018).
10. Hou, A. J., Chen, L. C. & Chen, Y. Y. Navigating CAR-T cells through the solid-tumour microenvironment. Nat. Rev. Drug Discov. 20, 531-550 (2021).
11. Carrot-Zhang, J. et al. Whole-genome characterization of lung adenocarcinomas lacking alterations in the RTK/RAS/RAF pathway. Cell Rep. 34, 108784 (2021).
12. Dewhurst, S. M. et al. Structural variant evolution after telomere crisis. Nat. Commun. 12, 2093 (2021).
13. Reimann, J. D. R. & Fletcher, C. D. M. Soft Tissue Sarcomas. in The Molecular Basis of Cancer 609-618.e2 (Elsevier, 2015).
14. Olshen, A. B., Venkatraman, E. S., Lucito, R. & Wigler, M. Circular binary segmentation for the analysis of array-based DNA copy number data. Biostatistics 5, 557-572 (2004).
15. Wala, J. A. et al. SvABA: genome-wide detection of structural variants and indels by local assembly. Genome Res. 28, 581-591 (2018).
16. Chan, S. et al. Structural variation detection and analysis using bionano optical mapping. Methods Mol. Biol. 1833, 193-203 (2018).
17. Raine, K. M. et al. AscatNgs: Identifying somatically acquired copy-number alterations from whole-genome sequencing data. Curr. Protoc. Bioinformatics 56, 15.9.1-15.9.17 (2016).
18. Favero, F. et al. Sequenza: allele-specific copy number and mutation profiles from tumor sequencing data. Ann. Oncol. 26, 64-70 (2015).
19. Gisselsson, D. et al. Chromosomal breakage-fusion-bridge events cause genetic intratumor heterogeneity. Proc. Natl. Acad. Sci. U.S.A 97, 5357-5362 (2000).
20. Verhaak, R. G. W., Bafna, V. & Mischel, P. S. Extrachromosomal oncogene amplification in tumour pathogenesis and evolution. Nat. Rev. Cancer 19, 283-288 (2019).
21. Deshpande, V. et al. Exploring the landscape of focal amplifications in cancer using AmpliconArchitect. Nat. Commun. 10, 392 (2019).
22. U.S. Patent Publication Number 20210047693A1, Mishcel et al., Ludwig Institute for Cancer Research Ltd University of California.
23. Bausch-Fluck, D. et al. The in silico human surfaceome. Proceedings of the National Academy of Sciences, 115 (46): 201808790, 2018.
24. Van Berkum, N. L. et al. Hi-C: A Method to Study the Threedimensional Architecture of Genomes. Journal of Visualized Experiments, (39):1 7, 2010.
25. Hou, A. J. et al. Navigating CAR-T cells through the solid-tumour microenvironment. Nature Reviews Drug Discovery, 20 (7):531{550, 2021.
26. Laks, E. et al. Clonal Decomposition and DNA Replication States Defined by Scaled Single-Cell Genome Sequencing. Cell, 179 (5):1207{1221.e22, 2019.
27. Sedlazeck, F. J. et al. Piercing the dark matter: bioinformatics of long-range sequencing and mapping. Nat. Rev. Genet., 19 (6):329{346, June 2018.
28. Ulahannan, N. et al. Nanopore sequencing of DNA concatemers reveals high-order features of chromatin structure. bioRxiv, 11 2019.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

I claim:
1. A method for identifying a cell surface antigen associated with amplification of an oncogene, comprising the steps of:
receiving genomic data of a subject, the genomic data comprising whole genome sequencing (WGS) to identify read depth, heterozygous SNPs, and somatic rearrangement junctions;
generating a junction-balanced haplotype graph from the genomic data, the graph having vertices and edges, the vertices corresponding to non-overlapping single-stranded reference genomic intervals and the edges corresponding to variant adjacencies;
identifying at least one oncogene amplicon-encoded cell surface protein from the junction-balanced haplotype graph;
wherein generating the junction-balanced haplotype graph comprises:
junction balancing a genome graph by assigning integer copy number to each of its vertices and edges according to a junction balanced constraint.
2. The method of claim 1, further comprising:
preparing an immune-oncology therapy that targets the at least one oncogene amplicon-encoded cell surface protein; and
administering said immune-oncology therapy to the subject.

3. The method of claim 2, wherein the immune-oncology therapy comprises chimeric antigen receptor (CAR) T-cells, bispecific T-cell engagers (BiTEs), and/or antibody-drug conjugates (ADCs) that target the at least one oncogene amplicon-encoded cell surface protein.

4. The method of claim 2, wherein the immune-oncology therapy comprises adoptive immunotherapy comprising CTLs targeting at least one oncogene amplicon-encoded cell surface protein.

5. The method of claim 1, wherein identifying the at least one oncogene amplicon-encoded cell surface protein comprises:
applying a predetermined threshold to at least one of Z-score expression, copy number, and co-copy number.

6. The method of claim 5, further comprising:
determining a co-copy number for each pair of vertices in the graph.

7. The method of claim 1, wherein identifying the at least one oncogene amplicon-encoded cell surface protein comprises:
computing interspersal of surface genes and oncogenes from the set of maximally linear alleles; and
applying a predetermined threshold to the interspersal.

8. The method of claim 7, wherein computing interspersal comprises:
deconvolution of the graph into linear and cyclic alleles; and
determining from the linear and cyclic alleles a set of maximally linear alleles.

9. The method of claim 1, wherein the genomic data comprises (short) read whole genome sequencing (WGS).

10. The method of claim 1, wherein the genomic data comprises WGS and long reads or optical mapping.

11. The method of claim 1, wherein the genomic data comprises direct library preparation (DLP+).

12. The method of claim 11, wherein the genomic data further comprises optical mapping and chromatin conformation capture.

13. The method of claim 1, wherein the oncogene amplicon comprises at least one known oncogene.

14. The method of claim 1, wherein the at least one oncogene amplicon-encoded cell surface protein resides on a chromosomally integrated amplicon, is linearly interspersed with one or more essential oncogenes, is overexpressed, and clonally co-amplified with one or more of the amplified oncogenes.

15. The method of claim 1, wherein the subject is suffering from cancer.

16. The method of claim 1, wherein the genomic data is derived from a tumor sample.

17. The method of claim 16, wherein the genomic data further comprises genomic data from a matched normal sample.

18. The method of claim 1, wherein the at least one oncogene amplicon-encoded cell surface protein is expressed at the surface of a tumor.

19. The method of claim 1, further comprising identifying an antigenic fragment of the at least one oncogene amplicon-encoded cell surface protein.

20. The method of claim 1, wherein the subject is suffering from a cancer selected from: pancreatic cancer, skin cancer, acute myeloid leukemia, metastatic carcinoma, prostate cancer, adrenal cancer, mullerian cancer, uterine cancer, kidney cancer, gall bladder cancer, cervical cancer, bladder cancer, ovarian cancer, breast cancer, head and neck cancer, esophageal cancer, lung cancer, liver cancer, colon cancer, gastrointestinal cancer, colorectal cancer, acute lymphoblastic cancer, lymphoma, sarcoma, melanoma and brain cancer.

21. The method of claim 1, wherein the subject is suffering from a solid tumor.

22. A method of preparing an adoptive immunotherapy comprising cytotoxic T-cells (CTLs), the method comprising obtaining a sample comprising CTLs and bringing the CTLs into contact with an oncogene amplicon-encoded cell surface protein identified by the method of claim 1 or fragment thereof, thereby allowing proliferation of activated amplicon-encoded cell surface protein-specific CTLs.

23. The method of claim 22, wherein the sample comprising CTLs is derived from the subject to be treated.

24. The method of claim 22, wherein the sample comprising CTLs is derived from a healthy donor.

25. A computer program product for identifying a cell surface antigen associated with amplification of an oncogene, the computer program product comprising a computer readable storage medium having program instructions embodied therewith, the program instructions executable by a processor to cause the processor to perform the method of claim 1.

* * * * *